CATALYSTS AND ELECTRODES FOR ELECTROCHEMICAL CELLS

Charles H. Worsham, Fanwood, N.J., assignor to Esso Research and Engineering Company, a corporation of Delaware
No Drawing. Filed Aug. 1, 1961, Ser. No. 128,366
3 Claims. (Cl. 204—47)

This invention relates to platinum comprising catalysts for use in electrochemical cells. In particular, this invention relates to platinum catalysts, electrodes bearing such catalysts and to an improved process for the preparation of the same. More particularly, this invention relates to a process for controlling the electrodeposition of platinum upon an electron conductive base so as to provide a novel formation and/or distribution of platinum black thereon creating a superior catalyst-bearing electrode.

The use of platinum catalyst in electrochemical cells is known in the art. Electrochemical cells for the oxidation of a combustible feed stock includes both fuel cells which generate electrical energy from such oxidation and electrolytic cells which must be supplied with electrical energy to effect such oxidation. The fuel cell can be operated solely as a power-producing device, or, by removing from the cell partial oxidation products; it can be employed to simultaneously produce electrical energy and valuable organic chemical products. The over-all fuel cell reaction is the sum of two essentially independent half-cell reactions. At the anode, hydrogen or a carbon-containing compound of lower oxidation state than carbon dioxide is electrochemically oxidized with a release of electrons to the anode. At the cathode oxygen is reduced with the acceptance of electrons to form hydroxyl ions, perhydroxyl ions or water, depending upon the electrolyte employed and other reaction conditions. The internal portion of the electrical circuit is completed by ion transfer through an electrolyte between such electrodes while electron transfer from anode to cathode outside such electrolyte completes the external portion of the electrical circuit.

The electrolytic cells differ from the aforedescribed fuel cells in that electrons are supplied to a cathode therein from an external (D.C.) power source resulting in hydrogen evolution from the electrolyte and anodic partial oxidation of an organic feed stock. The product recovered from such partial oxidation being a carbon-containing compound of lower oxidation state than carbon monoxide, e.g. alcohols, carboxylic acids, ketones, etc., as in fuel cells employed for the same purpose.

It has now been discovered that the effectiveness of platinum catalyst and hence of platinum-comprising electrodes in electrochemical reactions is surprisingly increased if the process whereby platinum is electrodeposited upon such electrode is controlled within certain critical limits hereinafter described in detail.

Thus, in accordance with this invention, platinum is electrodeposited upon an electrode base in a conventional electrodeposition or electroplating cell to provide cathodic reduction of platinum ions in accordance with the reaction

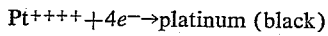

Platinum can be electrodeposited in this manner using a wide range of operating conditions, i.e. current densities and reduction potentials. However, it has been found that highly superior electrodes are surprisingly prepared by restricting the reduction potential at the cathode of such cell to within the range of about 0.05 to —0.08 volt vs. Standard Hydrogen Reference at a current density of about 2 to 20, preferably 2 to 10, amperes per square foot of electrode surface. The deposition will ordinarily be continued until at least about 1 and preferably about 4 to 12 grams of platinum per square foot is deposited upon the electrode surface.

The surface of the electrode base, i.e. support structure, upon which platinum is electrodeposited in accordance with this invention must be a continuous surface of electron conductive material, i.e. of a material known in the art as a conductor or semi-conductor. This includes all such materials upon which metal may be deposited in conventional electrodeposition processes.

The invention will be more fully understood from the following illustrative examples.

*Example 1.*—A number of electrodes were prepared by electrodeposition of platinum upon a platinum wire. The deposition was carried out in a cell comprising a glass beaker holding an aqueous electrodeposition bath containing 30 grams of chloroplatinic acid and 0.4 gram of lead acetate per liter. The anode employed was a 52 mesh platinum wire screen. The platinum wire to be coated and subsequently used as a fuel cell electrode served as the cathode of the electrodeposition cell. The diameter of the wires employed for this purpose was 0.04″. The anode and cathode were connected to an external electrical circuit which included conventional means for measuring and controlling both current and voltage in the circuit in addition to the direct current power source, i.e. current from an alternating current rectifier which in turn was connected to an ordinary 110–120 volts A.C. outlet. Electrodes were prepared in this manner by depositing platinum black on platinum wire, employing as the reduction potential at the cathode potentials ranging from +0.4 to —0.26 volt vs. Standard Hydrogen Reference. At each potential 4 grams of platinum black were deposited per square foot of electrode surface at a current density during deposition of about 4 to 10 amperes per ft.$^2$. The electrodes so prepared were then tested as the fuel electrode (anode) in a methanol-oxygen fuel cell. The electrolyte employed in such fuel cell was 0.5 molar sulfuric acid. The fuel cell was operated at room temperature, e.g. about 75° F. and atmospheric pressure. The fuel cell cathode was also of platinum. The effect of varying the electrode deposition voltage in the preparation of the electrodes employed as anodes in the fuel cell is shown in the following table:

TABLE I.—EFFECT OF VOLTAGE IN CATALYST DEPOSITION AS SHOWN IN FUEL CELL ANODE PERFORMANCE

| Catalyst Preparation | Fuel Cell Anode Performance with Methanol |
|---|---|
| Platinum Deposition, volts vs. Std. $H_2$ Reference | Amps./ft.$^2$ at 0.8 Volts Polarization from Theoretical Open Circuit Voltage |
| +0.40 | 10.7 |
| +0.24 | 44 |
| +0.20 | 246 |
| +0.12 | 272 |
| +0.05 | 311 |
| +0.00 | 312 |
| —0.08 | 370 |
| —0.10 | 257 |
| —0.13 | 203 |
| —0.26 | 217 |

*Example 2.*—Other electrodes were prepared in accordance with the process of Example 1 except for the following differences. The current densities employed to carry out this deposition were varied from 0.34 to 80 amperes/ft.$^2$. The electrodeposition voltage employed was about —0.05 vs. Std. $H_2$ Ref. and about 4 grams of platinum black per square foot of electrode surface were deposited on each electrode. The platinum ion diffusion rate and hence the current density was varied by two techniques, i.e. by stirring the electrolyte and by varying the concentration of the chloroplatinic acid solution from about 0.1 to 3 wt. percent. The electrodes so prepared were then tested as the anode of a fuel cell of the same type and in the same manner as in Example 1. The effect of the current density in preparing such electrodes upon the performance of such electrodes when employed in a fuel cell is shown in Table II.

TABLE II.—EFFECT OF CURRENT DENSITY IN CATALYST DEPOSITION AS SHOWN IN FUEL CELL ANODE PERFORMANCE

| Catalyst Preparation | Fuel Cell Anode Performance with Methanol | |
|---|---|---|
| Platinum Deposition Current Density, amps./ft.$^2$ | Amps./ft.$^2$ at Polarization Indicated From Theoretical Open Circuit Voltage | |
| | 0.6 volt | 0.8 volt |
| 0.34 | 7.3 | 21.7 |
| 2.0 | 94 | 308 |
| 9.4 | 79 | 350 |
| 37 | 36 | 181 |
| 80 | 24 | 112 |

*Example 3.*—Diffusion (porous) electrodes upon which platinum black has been deposited as in Examples 1 and 2, i.e. at the same potentials and current densities, are employed as fuel cell cathodes with the relative efficiencies of these electrodes corresponding to results obtained in Examples 1 and 2 when employed as anodes.

What is claimed is:

1. An electrode comprising an electron conductive base structure upon which platinum black catalyst has been electrodeposited at a reduction potential in the range of about $+0.05$ to $-0.08$ volt relative to Standard Hydrogen Reference at a current density of 2 to 10 amperes per square foot of electrode surface area.

2. An electrode prepared in accordance with claim 1 wherein said base structure is platinum and said platinum black catalyst is distributed on the surfaces of said base in an amount in the range of about 1 to 12 grams per square foot of electrode surface.

3. In the process for preparing an electrode for use in an electrochemical cell which comprises electrodepositing platinum black catalyst upon an electron conductive structure, the improvement which comprises effecting said electrodeposition at a reduction potential in the range of about $+0.05$ to $-0.08$ volt relative to Standard Hydrogen Reference and at a current density in the range of about 2 to 10 amperes per square foot of electrode surface area.

References Cited by the Examiner

UNITED STATES PATENTS

| 1,779,457 | 10/1930 | Zschiegner | 204—47 |
| 2,384,463 | 9/1945 | Gunn et al. | 136—86 |
| 2,984,604 | 5/1961 | Duva et al. | 204—47 |

OTHER REFERENCES

Blum, W.: Principles of Electroplating and Electroforming, 2nd ed. N.Y. McGraw-Hill, 1930, page 373 relied on.

WINSTON A. DOUGLAS, *Primary Examiner.*

JOHN R. SPECK, ALLEN B. CURTIS, *Examiners.*

S. PARKER, N. P. BULLOCH, *Assistant Examiners.*